(12) United States Patent
Miyazaki et al.

(10) Patent No.: US 7,235,291 B2
(45) Date of Patent: Jun. 26, 2007

(54) EXPANDABLE THERMOPLASTIC RESIN PRODUCT, METHOD FOR MANUFACTURE OF EXPANDABLE THERMOPLASTIC RESIN PRODUCT AND THERMOPLASTIC RESIN FOAM (75) Inventors: Kenji Miyazaki, Hasuda (JP); Masanori Nakamura, Hasuda (JP)

(73) Assignee: Sekisui Chemical Co., Ltd., Osaka (JP)

( * ) Notice: Subject to any disclaimer, the term of this patent is extended or adjusted under 35 U.S.C. 154(b) by 0 days.

(21) Appl. No.: 11/196,543

(22) Filed: Aug. 3, 2005

(65) Prior Publication Data

US 2005/0287342 A1    Dec. 29, 2005

Related U.S. Application Data (62) Division of application No. 10/362,170, filed as application No. PCT/JP01/07074 on Aug. 17, 2001.

(30) Foreign Application Priority Data

Aug. 25, 2000  (JP) .............................. 2000-255927
Apr. 26, 2001  (JP) .............................. 2001-129646

(51) Int. Cl.
B32B 3/26    (2006.01)
B32B 3/00    (2006.01)
B32B 9/00    (2006.01)
B32B 5/20    (2006.01)

(52) U.S. Cl. ................................ 428/304.4; 428/314.4; 428/315.9; 428/316.6; 428/318.4; 428/318.8

(58) Field of Classification Search ............. 428/304.4, 428/315.9, 316.6, 314.4, 318.4, 318.8
See application file for complete search history.

(56) References Cited

FOREIGN PATENT DOCUMENTS

JP          11179829 A   *   7/1999

OTHER PUBLICATIONS

Machine translation of JP 11-179829, see above for inventor and date.*

* cited by examiner

Primary Examiner—Victor S. Chang
(74) Attorney, Agent, or Firm—Townsend & Banta (57) ABSTRACT

A thermoplastic resin foam, which is high in thickness-direction compressive strength and low in flexural modulus of elasticity, can be set pliably along a curved applicable portion such as body's outer surface, and can effectively absorb an impact force imparted from the outside; and an expandable thermoplastic resin molded product providing the above foam. An expandable thermoplastic resin molded product comprises an expandable thermoplastic resin sheet-form material of expandable thermoplastic resin having a sheet body and many projections formed scattered on at least one surface of the sheet body, and an elastic thermoplastic material layer laminated on at least one surface of the expandable thermoplastic resin sheet-form material so as to be spread over the outer surfaces of the projections; and a thermoplastic resin foam obtained by foaming the expandable thermoplastic resin molded product.

18 Claims, 4 Drawing Sheets

EXPANDABLE THERMOPLASTIC RESIN PRODUCT, METHOD FOR MANUFACTURE OF EXPANDABLE THERMOPLASTIC RESIN PRODUCT AND THERMOPLASTIC RESIN FOAM

This application is a divisional of copending U.S. application Ser. No. 10/362,170, filed Feb. 21, 2003, which is a 371 of PCT/JP01/07074, filed Aug. 17, 2001.

TECHNICAL FIELD

The present invention relates to an expandable thermoplastic resin product, a method for manufacture thereof and a thermoplastic resin foam, more particularly to an expandable thermoplastic resin product useful in obtaining a thermoplastic resin foam which exhibits superior compressive strength in its thickness direction and has a suitable application on a protector or the like, a method for manufacture thereof, and the preceding thermoplastic resin foam.

BACKGROUND ART

Thermoplastic resin foams are light weight, exhibit superior heat resistance and flexibility and are readily heat-processable into shapes. Such thermoplastic resin foams have thus achieved wide use as various cushioning, packaging and heat-insulating materials.

In the sporting area, various protectors have been proposed which serve to protect a part of a human body from a high impact force. These types of protectors generally incorporate a layer of thermoplastic resin foam as a shock absorber. If a thermoplastic resin foam is to be used as a shock absorber, it must have the ability to absorb a large part of energy when compressed in its thickness direction. This accordingly requires that the thermoplastic resin foam should have a high compressive strength in its thickness direction. Also because a human body has a contoured surface, it is desired that the thermoplastic resin foam layer is flexible enough to readily conform to the contours of the human body, i.e., has a low flexural modulus.

Conventionally, methods have been proposed for manufacture of a foam which has the increased compressive strength only in its thickness direction. For example, Japanese Patent Laying-Open No. Hei 9-150431 discloses a method in which foaming of an expandable thermoplastic resin sheet is effected after it has been laminated with a second sheet having a sufficient strength to suppress planar expansion of the expandable thermoplastic resin sheet. Accordingly, the second sheet acts to suppress planar expansion of the expandable thermoplastic resin sheet while being expanded. Hence, as foaming proceeds, the expandable thermoplastic resin sheet expands nearly one-dimensionally in its thickness direction, so that foam cells are shaped into spindles extending in the thickness direction.

The above-described prior method successfully increases the compressive strength in the thickness direction but fails to increase the compressive strength in the planar direction. The resulting thermoplastic resin foam is expected to have a high compressive modulus but a low flexural modulus. However, the presence of the second sheet which acts to suppress planar expansion of the expandable thermoplastic resin sheet actually increases a flexural modulus of the laminate. Consequently, its flexibility has been insufficient.

In Japanese Patent Laying-Open No. Hei 10-44178, a method is disclosed for allowing an expandable thermoplastic resin sheet to undergo pseudo-one-dimensional expansion in its thickness direction by devising its shape. However, the method described in this prior reference results in the formation of high-density fusion bond interfaces which extend in the thickness direction of a resulting foam. These interfaces increase a flexural modulus of the foam, making its flexibility insufficient. That is, this prior art failed to reduce a flexural modulus of a resulting foam while increasing its compressive strength across the thickness.

In Japanese Patent. Laying-Open No. Hei 5-208421, a method is disclosed for manufacturing a composite foam product by integrating a non-foamable layer with a foamable layer. This prior art contemplates to obtain the composite foam product using clean materials which maintain high fluidity even in such conditions that a pressure and a shear force are little exerted thereon. For this purpose, this reference discloses a method in which the non-foamable layer consisting of thermoplastic elastomer powder, together with the foamable layer consisting of resin powder of ethylene-vinylacetate copolymer and a heat decomposable foaming agent, are subjected to powder molding so that they are foam processed.

However, the manufacturing method described in this prior reference simply suggests an easy way to manufacture the composite foam having a complex shape without a residual strain. That is, the resulting composite foam has a foam layer which is different from that produced via one-dimensional expansion of the foamable layer in its thickness direction. Accordingly, a preferential and sufficient increase in compressive strength of the composite foam in its thickness direction does not result.

DISCLOSURE OF THE INVENTION

In view of the current state of the above-described prior art, it is an object of the present invention to provide a thermoplastic resin foam which has a high compressive strength in its thickness direction and a low flexural modulus so that it can readily conform to a contoured application site, such as an outer surface of a human body, and effectively absorb an impact force, if applied from outside, along its thickness; an expandable thermoplastic resin product which enables us to obtain the thermoplastic resin foam; and a method for manufacture of such an expandable thermoplastic resin product.

In accordance with a broad aspect of the present invention, an expandable thermoplastic resin product is provided which includes a sheet-like structure of expandable thermoplastic resin and a layer of elastic thermoplastic material. The sheet-like structure has a base sheet and a plurality of raised portions provided in a distributed manner over at least one surface of the base sheet. The layer of elastic thermoplastic material is placed on at least one surface of the sheet-like structure of expandable thermoplastic resin so that the layer covers outer surfaces of the raised portions.

In a particular aspect of the expandable thermoplastic resin product in accordance with the present invention, the expandable thermoplastic resin product contains a high crosslinked thermoplastic resin composition and a low crosslinked thermoplastic resin composition, which are little compatible with each other, and a heat decomposable blowing agent.

In another particular aspect of the expandable thermoplastic resin product in accordance with the present invention, the elastic thermoplastic material preferably has a flexural modulus in the range of 5 MPa–1,000 MPa, preferably in the range of 5 MPa–500 MPa.

In a further particular aspect of the expandable thermoplastic resin product in accordance with the present invention, a thermoplastic resin having an elastic property constitutes the elastic thermoplastic material.

In a further particular aspect of the expandable thermoplastic resin product in accordance with the present invention, the plurality of raised portions are provided in a distributed manner on one surface of the sheet-like structure of expandable thermoplastic resin.

In accordance with another broad aspect of the present invention, a method for manufacture of an expandable thermoplastic resin product is provided. The method comprises the steps of superimposing a layer of elastic thermoplastic material on one surface of a sheet of expandable thermoplastic resin to prepare a laminate sheet; providing a pair of counter rotating shaping rolls spaced apart by a clearance smaller in dimension than the thickness of the laminate sheet, with at least one of the shaping rolls having a plurality of recesses in a distributed manner on its peripheral surface; introducing the laminate sheet while its surface is in a softened condition into the clearance between the pair of shaping rolls and then withdrawing the laminate sheet from the pair of shaping rolls so that the laminate sheet is shaped to define, on at least one side thereof, projections corresponding to the recesses defined on the peripheral surface of the shaping roll; and cooling an expandable thermoplastic resin product having the projections. These projections correspond to the preceding raised portions.

In a particular aspect of the method for manufacture of an expandable thermoplastic resin product, in accordance with the present invention, the laminate sheet is introduced into the clearance between the pair of shaping rolls such that the layer of elastic thermoplastic material is brought into contact with the recesses. In this case, each projection comprises the raised portion and a portion of the elastic thermoplastic material layer that covers the raised portion.

The thermoplastic resin foam in accordance with the present invention includes a sheet of thermoplastic resin foam having a relative low expansion ratio; a plurality of basic raised portions integrally provided on at least one surface of the thermoplastic resin foam sheet in a distributed manner and comprising a thermoplastic resin foam having a relatively high expansion ratio; a low foamed layer having a relatively low expansion ratio and disposed to cover areas of the basic raised portions that exclude those in contact with the thermoplastic resin foam sheet so that the low foamed layer and the basic raised portions together constitute raised portions; and a layer of elastic thermoplastic material disposed to cover the at least one surface of the foam sheet and the raised portions and also fill spaces between the raised portions.

In a particular aspect of the thermoplastic resin foam in accordance with the present invention, the layer of elastic thermoplastic material has a foam structure.

In another particular aspect of the thermoplastic resin foam in accordance with the present invention, the layer of elastic thermoplastic material has a flexural modulus of 5 MPa–1,000 MPa.

In a further particular aspect of the thermoplastic resin foam in accordance with the present invention, the layer of elastic thermoplastic material is composed of a thermoplastic resin produced via crosslinking of the thermoplastic resin which constitutes the foam sheet.

In a further particular aspect of the thermoplastic resin foam in accordance with the present invention, crosslinking of the thermoplastic resin is achieved by a method using a silane-grafted polymer.

In the thermoplastic resin foam in accordance with the present invention, the raised portions preferably have a cylindrical shape. Preferably, such raised portions are arranged in a zigzag fashion.

In a further broad aspect of the thermoplastic resin foam in accordance with the present invention, the thermoplastic resin foam is provided which includes a sheet of thermoplastic resin foam having a relative low expansion ratio; a plurality of basic raised portions integrally provided on at least one surface of the thermoplastic resin foam sheet in a distributed manner and comprising a thermoplastic resin foam having a relatively high expansion ratio; a low foamed layer having a relatively low expansion ratio and disposed to cover areas of the basic raised portions that exclude those in contact with the sheet of thermoplastic resin foam so that the low foamed layer and the basic raised portions together constitute raised portions; and a second foam layer disposed to cover the raised portions and also fill spaces between the raised portions. Preferably, the second foam layer comprises the preceding layer of elastic thermoplastic material.

In accordance with a further broad aspect of the present invention, a method for manufacture of the thermoplastic resin foam of the present invention is provided. This method involves applying heat to the expandable thermoplastic resin product constructed in accordance with the present invention to thereby initiate expansion thereof.

BEST MODE FOR CARRYING OUT THE INVENTION

The details of the expandable thermoplastic resin product, the method for manufacture thereof and resulting thermoplastic resin foam are below described with reference to the drawings.

(Thermoplastic Resin for Use in a Sheet-Like Structure of Expandable Thermoplastic Resin)

The type of the thermoplastic resin which constitutes the sheet-like structure of expandable thermoplastic resin is not particularly specified, so long as it is expandable. Examples of such thermoplastic resins include olefinic resins, olefinic copolymers such as an ethylene-vinyl acetate resin, polyvinyl chloride, hydrogenated polyvinyl chloride, ABS resin, polystyrene, polycarbonate, polyamide, polyvinylidene fluoride, polyphenylene sulfide, polysulfon, polyether ether ketone and their copolymers. Examples of olefinic resins include low-density polyethylene, high-density polyethylene and linear low-density polyethylene ("polyethylene" is hereinafter intended to encompass low-density polyethylene, high-density polyethylene, linear low-density polyethylene and their mixtures); random polypropylene, homopolypropylene and block polypropylene ("polypropylene" is hereinafter intended to encompass random polypropylene, homopolypropylene, block polypropylene and their mixtures); and the like. The above-listed thermoplastic resins may be used alone or in combination.

The use of olefinic resins, such as polyethylene and polypropylene, alone or in combination, is preferred for their ability to improve surface smoothness. Particularly preferred are high-density polyethylene, homopolypropylene and mixtures containing at least one of these reins, which can accomplish simultaneous improvement of surface smoothness and compressive strength.

As stated above, the sheet-like structure of expandable thermoplastic resin has a plurality of raised portions provided in a distributed manner on at least one surface of the base sheet which constitutes a main part of the sheet-like structure. The thermoplastic resin for use in the base sheet may be either identical to or different in type from that for use in the raised portions. In view of expandability and adhesion, they are preferably similar in type to each other.

Preferably, the expandable thermoplastic resin for use in the sheet-like structure of expandable thermoplastic resin comprises a mixture of a high crosslinked thermoplastic resin composition and a low crosslinked thermoplastic resin composition which are little compatible with each other (as recited in claim 2). This increases expansion stability and more likely results in obtaining a product having a higher expansion ratio.

The high and low crosslinked thermoplastic resin compositions, as used herein, are relative expressions used properly depending upon the relative level of crosslinking. Out of two crosslinked thermoplastic resin compositions, one composition comprised chiefly of a thermoplastic resin having a relatively higher level of crosslinking is referred to as the high crosslinked thermoplastic resin composition (a) and the other composition as the low crosslinked thermoplastic resin composition (b). The low crosslinked thermoplastic resin composition (b) can be a noncrosslinked thermoplastic resin composition.

The low crosslinked thermoplastic resin composition (b), if little compatible with the high crosslinked thermoplastic resin composition (a), readily flows during expansion. This reduces a possibility that the resulting thermoplastic resin foam may show short shot and results in the formation of regular and well-ordered fusion bond interfaces between the foam sheet, raised portions and elastic thermoplastic material.

A difference in solubility parameter between respective thermoplastic resin components of the high crosslinked thermoplastic resin composition (a) and the low crosslinked thermoplastic resin composition (b) is preferably within the range of 0.1–2, more preferably within the range of 0.2–1.5. This combination enables fine dispersion of those resin components. If the solubility parameter difference is greater than 2.0, the high crosslinked thermoplastic resin composition (a) and the low crosslinked thermoplastic resin composition (b) are dispersed very coarsely to result in the reduced expansion ratio of the resulting foam. If the solubility parameter difference is less than 0.1, these two types of thermoplastic resin components become more compatible with each other to result in the difficulty to achieve independent formation of a portion consisting of the high crosslinked thermoplastic resin composition (a) and a portion consisting of the low crosslinked thermoplastic resin composition (b).

The solubility parameter refers to a value calculated from the following equation:

$$\Phi = \Delta \Sigma Fi/M$$

where, $\Delta$ is a density of a thermoplastic resin component; M is a molecular weight of a monomer which constitutes the resin component; and Fi is a molar attraction constant of a constituent group of the monomer.

A difference in melt index (MI) between thermoplastic resins for use in the high crosslinked thermoplastic resin composition (a) and the low crosslinked thermoplastic resin composition (b) is preferably 5–13 g/10 minutes, more preferably 7–11 g/10 minutes. If the MI difference is larger than the specified range, the high and low crosslinked thermoplastic resin composition (a) and (b) may be dispersed very coarsely to occasionally result in the reduced expansion ratio of the resulting foam. On the other hand, if it becomes smaller than the specified range, these two types of thermoplastic resins become more compatible with each other to result in the difficulty to achieve independent formation of a portion consisting of the high crosslinked thermoplastic resin composition (a) and a portion consisting of the low crosslinked thermoplastic resin composition (b).

The MI refers to a value determined according to JIS K 7210.

The high crosslinked thermoplastic resin composition (a) and the low crosslinked thermoplastic resin composition (b) are preferably mixed at a ratio by weight of 2:8–8:2, more preferably 4:6–6:4, further preferably 5:5. The above-specified mixing proportion permits fine dispersion of the high and low crosslinked thermoplastic resin compositions (a) and (b) and results in obtaining a thermoplastic resin foam with a high expansion ratio and superior surface smoothness.

If the crosslinking level of the high crosslinked thermoplastic resin composition (a) is excessively high, an expansion ratio of a resulting thermoplastic resin foam may be lowered. On the other hand, if it is excessively low, cell breakage may occur during expansion to result in the failure to obtain uniform cells. Accordingly, the high crosslinked thermoplastic resin composition (a) preferably has a gel fraction, indicative of the level of crosslinking, of 5–60% by weight, more preferably 10–30% by weight.

If the crosslinking level of the low crosslinked thermoplastic resin composition (b) is high, the flowability and surface smoothness of a resulting thermoplastic resin foam may be reduced. Hence, the low crosslinked thermoplastic resin composition (b) preferably has a gel fraction, as indicative of the level of crosslinking, of up to 5% by weight, more preferably up to 3% by weight. The gel fraction, as used herein, refers to a percentage of a weight of a crosslinked thermoplastic resin component remained after immersion in xylene at 120□ for 24 hours relative to a weight of the crosslinked thermoplastic resin component prior to immersion in xylene.

The mixture of the high crosslinked thermoplastic resin composition (a) and the low crosslinked thermoplastic resin compositions (b) can be prepared by mixing two types of thermoplastic resins and crosslinking the high crosslinking thermoplastic resin composition (a) preferentially relative to the low crosslinking thermoplastic resin composition (b). Applicable techniques include, for example, (1) a technique which uses a crosslinking agent capable of preferential crosslinking of the high crosslinking thermoplastic resin composition (a) relative to the low crosslinking thermoplastic resin composition (b); (2) a technique which comprises a first step wherein the high crosslinking thermoplastic resin composition (a) is mixed with a crosslinkable resin (c) to provide a mixture which is subsequently crosslinked and a second step wherein the resultant is mixed with the low crosslinked thermoplastic resin composition (b); (3) a technique which comprises mixing a crosslinkable resin (c) with the high and low crosslinking thermoplastic resin compositions (a) and (b) to provide a mixture which is subsequently crosslinked.

The technique (3) is most preferred among them since it results in the formation of small and uniform particle size portions of the high and low crosslinked thermoplastic resin compositions (a) and (b), is easier to achieve preferential crosslinking of the high crosslinking thermoplastic resin composition (a), and enables easy preparation of the thermoplastic resin.

The crosslinkable resin (c) refers to a thermoplastic resin which is crosslinkable and has approximately the same MI as the high crosslinking thermoplastic resin composition (a), and can be illustrated by thermoplastic resins having an unsaturated group such as vinyl, allyl or propenyl, or a hydroxyl, carboxyl, epoxy, amino, silanol or silanoate group.

Examples of crosslinkable resins (c) include maleic acid modified thermoplastic resins, silane modified thermoplastic resins and the like. The silane modified thermoplastic resins are preferred for their ability to readily crosslink with the high crosslinking thermoplastic resin composition (a) either exclusively or preferentially relative to the low crosslinking thermoplastic resin composition (b) and to readily crosslink subsequent to the mixing.

Specific examples of silane modified thermoplastic resins include silane modified polyethylene, silane modified polypropylene and the like. The silane modified thermoplastic resins can be obtained via graft modification of thermoplastic resins using an unsaturated silane compound.

If the difference in melt index between the silane modified thermoplastic resin and the high crosslinking thermoplastic resin composition (a) is larger, it becomes more difficult for the silane modified thermoplastic resin to crosslink with the high crosslinking thermoplastic resin composition (a) either exclusively or preferentially over the low crosslinking thermoplastic resin composition (b). Hence, the melt index difference is preferably up to 10 g/10 minutes, more preferably up to 6 g/10 minutes.

The unsaturated silane compound refers to a compound represented by the general formula $R^1SiR^2_mY_{3-m}$, wherein m is 0, 1 or 2.

In the formula, $R^1$ represents an organic functional group. Examples of organic functional groups include alkenyl groups such as vinyl, allyl, propenyl and cyclohexenyl; glycidyl; amino; methacryl; and halogenated alkyl groups such as (-chloroethyl and (-bromoethyl.

In the formula, $R^2$ represents an aliphatic saturated hydrocarbon group or aromatic hydrocarbon group and may be methyl, ethyl, propyl, decyl or phenyl, for example. In the formula, Y represents a hydrolyzable organic functional group. Examples of such groups include methoxy, ethoxy, formyloxy, acetoxy and propionoxyarylamino, for example. When m is 0 or 1, Y's may be identical to or different from each other.

For the purpose of accelerating a crosslinking reaction, the compound represented by the general formula $CH_2=CHSi(OA)_3$ may preferably be used as the unsaturated silane compound. In this formula, A is an aliphatic saturated hydrocarbon group containing preferably 1–8, more preferably 1–4 carbon atoms.

Examples of preferred unsaturated silane compounds as represented by $CH_2=CHSi(OA)_3$ include vinyltrimethoxysilane and vinyltriethoxysilane.

The technique used to produce the silane-grafted polymer is not particularly specified and can be any technique generally known in the art. One exemplary technique involves reacting polyethylene with the preceding unsaturated silane compound represented by $R^1SiR^2_mY_{3-m}$ and an organic peroxide to obtain silane-modified polyethylene.

For the above silane-grafted polymers having a silyl group, Y, if methoxy, is hydrolyzed when contacted with water to form a hydroxyl group. The hydroxyl groups in different molecules react with each other to form Si—O—Si linkages, so that the silane-grafted polymers are crosslinked to each other.

The above-described water treatment technique includes a steam exposure technique, as well as a water immersion technique. In the case where such a treatment is carried out at a temperature of higher than 100□, it may be performed under pressure. In the treatment, if a temperature of water or steam is lowered, a crosslinking reaction rate decreases. On the other hand, if it is excessively raised, the expandable thermoplastic resin product is caused to melt. Accordingly, the temperature of water or steam may be suitably chosen depending upon the type of the thermoplastic resin used. It is preferably in the range of 80–120□. Also, the shortened water treatment period possibly prevents the crosslinking reaction from going to completion. Thus, the water treatment period is preferably in the range of 0.5–12 hours.

A technique used to mix the silane-grafted polymer with the thermoplastic resin is not particularly specified, so long as it provides a uniform mixture thereof. For example, a technique may be utilized in which the thermoplastic resin, together with the silane-grafted polymer, are fed into a single- or twin-screw extruder where they are melt mixed. In accordance with other applicable techniques, they are melt mixed using a roll, a kneader or the like.

If the silane-grafted polymer is added in an excessively large amount, excessive crosslinking may occur to result in the reduced expansion ratio of the resulting thermoplastic resin foam. On the other hand, an excessively small amount thereof causes breakage of cells to result in the difficulty to obtain uniform foam cells. Accordingly, the silane-grafted polymer is preferably added in the amount of 5–50 parts by weight, more preferably 10–35 parts by weight, based on 100 parts by weight of the thermoplastic resin.

When silane crosslinking is carried out by using the silane-grafted polymer, a suitable silane crosslinking catalyst may be used, if necessary. The type of the silane crosslinking catalyst is not particularly specified, so long as it promotes a crosslinking reaction between the silane-grafted polymers. Examples of such catalysts include dibutyltin diacetate, dibutyltin dilaurate, dioctyltin dilaurate, stannous octoate, stannousoleate, leadoctoate, zinc2-ethylhexoate, cobaltoctoate, lead naphthenate, zinc caprylate, and zinc stearate.

The higher loading of the silane crosslinking catalyst reduces an expansion ratio of the resulting thermoplastic resin foam. On the other hand, the lower loading thereof slows down the crosslinking reaction and thus prolongs a period required for the water treatment. Accordingly, the silane crosslinking catalyst is preferably added in the amount of 0.01–0.1 parts by weight, based on 100 parts by weight of the thermoplastic resin.

Another technique is below described which utilizes a peroxide to crosslink the thermoplastic resin.

The type of the peroxide for use in the present technique is not particularly specified. Examples of peroxides include dibutyl peroxide, dicumyl peroxide, tert-butylcumyl peroxide, di-isopropyl peroxide and the like. The use of dicumyl peroxide and tert-butylcumyl peroxide is preferred because their decomposition temperatures are closer to a melting point of the thermoplastic resin. Particularly preferred is dicumyl peroxide.

If the peroxide is added in an excessively large amount, a decomposition reaction of the thermoplastic resin may be allowed to proceed favorably, resulting in the formation of colored thermoplastic resin foam. On the other hand, if the peroxide is added in an excessively small amount, in sufficient crosslinking of the thermoplastic resin may result. Hence, the peroxide is preferably added in the amount of 0.5–5 parts by weight, more preferably of 1–3 parts by weight, based on 100 parts by weight of the thermoplastic resin.

A further technique is now described which utilizes electron beam exposure to crosslink the thermoplastic resin.

The higher doses of irradiation lead to excessive crosslinking which causes reduction in expansion ratio of a resulting foam. The lower doses of irradiation cause breakage of foam cells to result in the failure to obtain uniform foam cells. Accordingly, a suitable dosage may be preferably in the range of 1–20 Mrads. The dosage of 3–10 Mrads is particularly preferred. Any technique can be employed which exposes the thermoplastic resin to an ionizing radiation. An exemplary technique involves passing the thermoplastic resin between a pair of opposing electron beam generators for exposing an electron beam to the thermoplastic resin.

The blowing agent incorporated in the sheet-like structure of expandable thermoplastic resin is preferably heat decomposable. The type of the heat decomposable blowing agent is not particularly specified, so long as it exhibits a decomposition temperature higher than a melting temperature of the thermoplastic resin used. Examples of heat decomposable blowing agents include inorganic heat decomposable blowing agents such as sodium bicarbonate, ammonium carbonate, ammonium bicarbonate, azido compounds and sodium borohydride; azodi-carbonamide, azobisformamide, azobisisobutyronitrile, barium azodicarboxylate, diazoaminobenzene, N, N'-dinitrosopenta-methylenetetramine, p-toluenesulfonyl hydrazide, P, P'-oxybis(benzene sulfonyl hydrazide), trihydrazine triazine and the like. The use of azodicarbonamide is preferred because its decomposition temperature and rate are readily controllable and because it has a higher level of hygienic quality and generates a larger volume of gases. If the heat decomposable blowing agent is added in an excessively larger amount, bubble breakage may occur to result in the failure to form uniform cells. On the other hand, if added in an excessively smaller amount, insufficient expansion may result. Accordingly, the heat decomposable blowing agent is preferably incorporated in the amount of 1–25 parts by weight, based on 100 parts by weight of the thermoplastic resin.

When necessary, the thermoplastic resin for use in the sheet-like structure of expandable thermoplastic resin may contain a reinforcing material such as a glass, carbon or polyester short fiber; and/or a filler such as calcium carbonate, aluminum hydroxide or glass powder in order to improve strength thereof.

(Elastic Thermoplastic Material)

The elastic thermoplastic material for use in the expandable thermoplastic resin product of the present invention preferably shows a wide range of elastic deformation when it is placed under a compressive, bending, tensile or other stress. Specifically, the elastic thermoplastic material refers to a material which shows elastic deformation in the 10–100% range with in deformation stain. Examples of such materials include thermoplastic elastomers such as olefinic elastomers, polyester elastomers and styrenic elastomers; ethylene-vinyl acetate copolymer (EVA); thermoplastic polyurethane; soft polyvinyl chloride; and the like. Since the above-listed materials are thermoplastic and accordingly melt-fabricable, they are readily laminated with the sheet-like structure of expandable thermoplastic resin into a unitary form.

The elastic thermoplastic material generally has a flexural modulus in the range of 5 MPa–1,000 MPa, preferably in the range of 5 MPa–500 MPa.

If its flexural modulus exceeds 1,000 MPa, the resulting thermoplastic resin foam may also have a high flexural modulus. If below 5 MPa, the resulting thermoplastic resin foam may exhibit poor durability against friction.

Examples of elastic thermoplastic materials include olefinic thermoplastic elastomers, styrenic thermoplastic elastomers, polyester thermoplastic elastomers and amide thermoplastic elastomers.

Preferably, the elastic thermoplastic material is expandable. The elastic thermoplastic material, if expanded, shows a lower flexural modulus than its original flexural modulus. This is more favorable in accomplishing the purpose of the present invention.

Various elastic thermoplastic materials such as those listed above can be used in combination with a blowing agent to constitute such an expandable elastic thermoplastic material. Examples of useful blowing agents include the above-listed heat decomposable blowing agents. The loading of the blowing agent may be determined depending upon the expansion ratio of the elastic thermoplastic material used. If the loading of the blowing agent is excessively high, a compressive strength of a resulting thermoplastic resin foam may become low. On the other hand, if excessively low, its flexural modulus reducing effect may become small. Accordingly, the blowing agent is preferably loaded in the amount of 0.3 parts–10 parts, more preferably 0.5 parts–5 parts, based on 100 parts by weight of the elastic thermoplastic material.

When necessary, the elastic thermoplastic material may be crosslinked as by the preceding crosslinking techniques.

The ratio by amount of the elastic thermoplastic material to the raised portions may be suitably varied depending upon the diameter of the raised portions. The excessively high ratio lowers a compressive strength of a thermoplastic resin foam obtained via expansion of the expandable thermoplastic resin product. On the other hand, the excessively low ratio results in the failure to accomplish the object of the present invention, i.e., to achieve reduction of a flexural modulus. Hence, where the plurality of raised portions are integrally provided on the base sheet, the elastic thermoplastic material constitutes a diameter portion that preferably accounts for 10–60%, more preferably 30–50%, of a diameter of a projection which consists of each raised portion and a covering elastic material portion.

(Configuration of an Expandable Thermoplastic Resin Product)

The expandable thermoplastic resin product of the present invention is composed of the aforesaid expandable thermoplastic resin and includes a sheet-like structure of expandable thermoplastic resin which has a plurality of raised portions provided on at least one surface thereof in a distributed manner. Also, a layer of the elastic thermoplastic material is placed on the at least one surface of the sheet-like structure of expandable thermoplastic resin so that the layer of elastic thermoplastic material covers outer surfaces of the raised portions but leaves spaces between the raised portions. One embodiment of the expandable thermoplastic resin product is below described with reference to FIG. 1.

Figure 1:
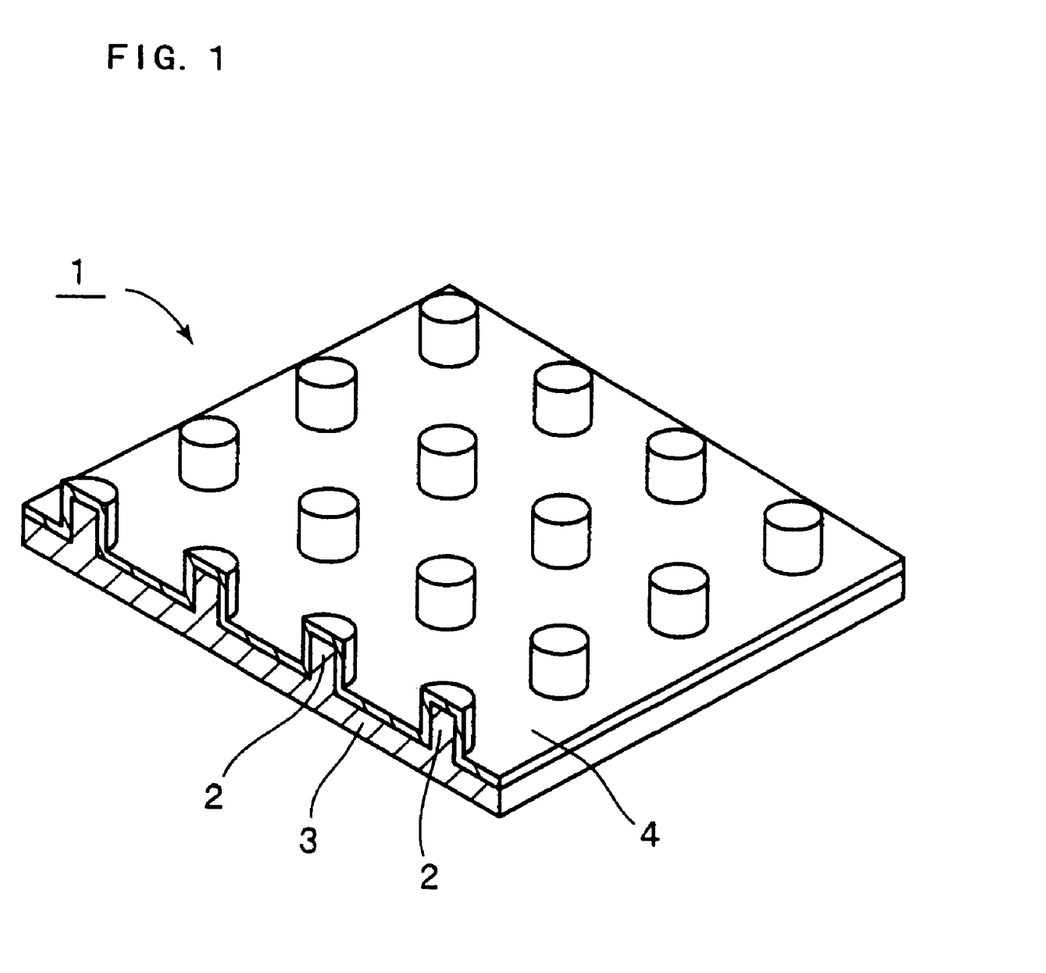
FIG. 1 is a perspective view which shows an appearance of an expandable thermoplastic resin product embodiment of the present invention with a portion being cut away to reveal its section.

An expandable thermoplastic resin product 1 has a plurality of raised portions 2 provided on one surface of a base sheet 3 in a distributed manner. An elastic thermoplastic material 4 is further placed on the base sheet 3 in such a way to cover outer surfaces of the raised portions 2.

Figure 2:
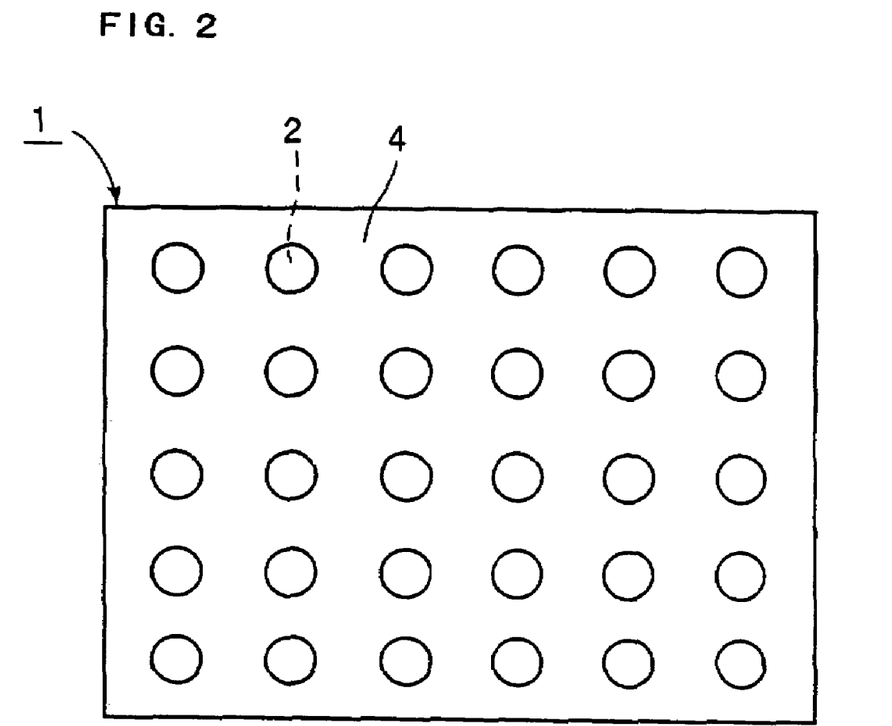
FIG. 2 is a schematic plan view of an expandable thermoplastic resin product embodiment of the present invention.

In the expandable thermoplastic resin product 1, those raised portions 2 covered with the elastic thermoplastic material 4 are generally uniformly arranged in a lattice-like pattern, as shown in FIGS. 1 and 2. The shape of the raised portions 2 is not particularly specified and may be a hexahedron, cylinder or sphere, for example. In considerations of uniform expansion of the raised portions, the cylindrical shape is preferred, as shown in FIGS. 1 and 2.

If the raised portion 2 is cylindrical, its diameter may be varied depending on the thickness and expansion ratio of the contemplated foam and is not particularly specified. If the diameter is excessively large, expansion becomes slow. On the other hand, if the diameter is excessively small, the cylindrical raised portions become more likely to melt and undergo shape change when exposed to heat during expansion. This disturbs pseudo-one-dimensional expansion thereof to result in the increased variations of thickness and weight precisions and the reduced surface smoothness of the resulting foam. Accordingly, the raised portions 2, if cylindrical, preferably have diameters of 1–30 mm, more preferably 2–20 mm, after they have been covered with the elastic thermoplastic material.

The distance between neighboring raised portions 2, 2 is varied depending on the expansion ratio, thickness and the like of the foam contemplated and is not particularly specified. If the distance is excessively long, short shot may occur when the raised portions are expanded. On the other hand, if the distance is excessively short, the large expansion in the lateral and longitudinal directions may occur due to the limited expansion area. Accordingly, the center distance between neighboring raised portions 2, 2 is preferably 2–50 mm, more preferably 3–30 mm.

Figure 3:
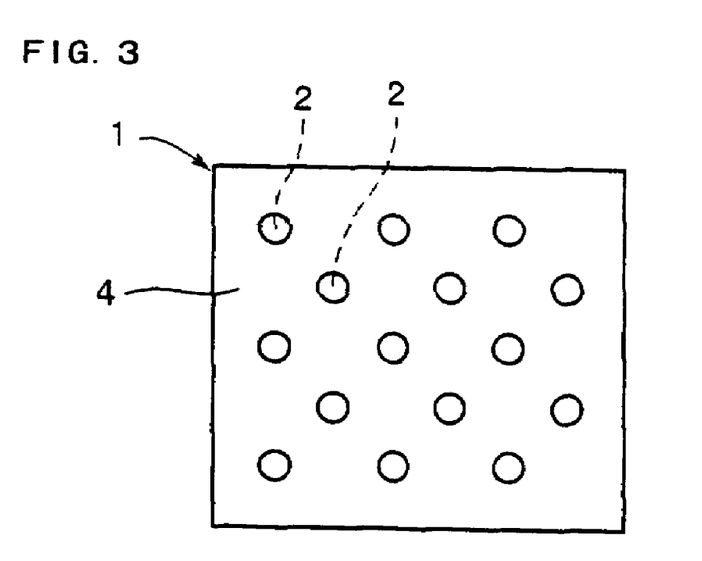
FIG. 3 is a schematic plan view which explains an altered expandable thermoplastic resin product embodiment of the present invention.

If the final foam is to show improved thickness and weight precisions, high surface smoothness and uniform expansion ratio, the plurality of raised portions 2 must be arranged generally uniformly on a plane of the base sheet 3. The particular arrangement thereof is not specified. They may be arranged in a lattice pattern as shown in FIGS. 1 and 2, or alternatively, in a zigzag pattern as shown in FIG. 3. If arranged in a lattice pattern, the individual raised portions 2 when expanded define tetragonal prisms in the final foam, so that the foam exhibits the increased compressive strength.

If arranged in a zigzag pattern, the individual raised portions 2 when expanded define hexagonal prisms, so that a honeycomb-like structure is formed in the resulting foam. This structure increases surface smoothness and further improves compressive strength of the resulting foam. It is accordingly preferred that the raised portions are arranged in a zigzag pattern.

In the sheet-like structure of expandable thermoplastic resin, the thickness of the base sheet 3 is varied depending on the expansion ratio, thickness and the like of the foam contemplated and is not particularly specified. If the thickness is excessively large, the base sheet when expanded may dislocate the raised portions to result in the large expansion in the lateral and longitudinal directions. If the thickness is excessively small, the base sheet may fail to retain the raised portions. Accordingly, the base sheet 3 preferably has a thickness of 0.05–3 mm, preferably 0.1–2 mm.

The ratio by amount of the elastic thermoplastic material for use in the present invention to the sheet-like structure of expandable thermoplastic resin may be suitably varied depending upon the diameter of the raised portions. If the ratio is excessively high, short shot may occur when the sheet-like structure of expandable thermoplastic resin expands. On the other hand, the excessively low ratio results in the failure to accomplish the purpose of this invention, i.e., to obtain a foam having a low flexural modulus. For the above reasons, the elastic thermoplastic material is proportioned to constitute a diameter portion which is preferably 15–75%, more preferably 35–60% of a diameter of the raised portions covered with the elastic thermoplastic material 4.

In the case where the elastic thermoplastic material 4 is placed to lie over the opposite surface of the base sheet 3 of expandable thermoplastic resin that does not carry the raised portions 2, the thickness of the elastic thermoplastic material may be varied depending on the sum in height of the expandable thermoplastic resin base sheet and the raised portion. If the thickness of the elastic thermoplastic material relative to the sum in height thereof is excessively large, a thermoplastic resin foam obtained via expansion of the expandable thermoplastic resin product shows a reduction in compressive strength. On the other hand, if it is excessively small, it becomes difficult to obtain a low flexural modulus foam.

Any technique by which the elastic thermoplastic material and sheet-like structure of expandable thermoplastic resin can be laminated into an integral form may be utilized. Examples of such lamination techniques include thermal bonding, co-injection, co-extrusion and the like.

Figure 5:
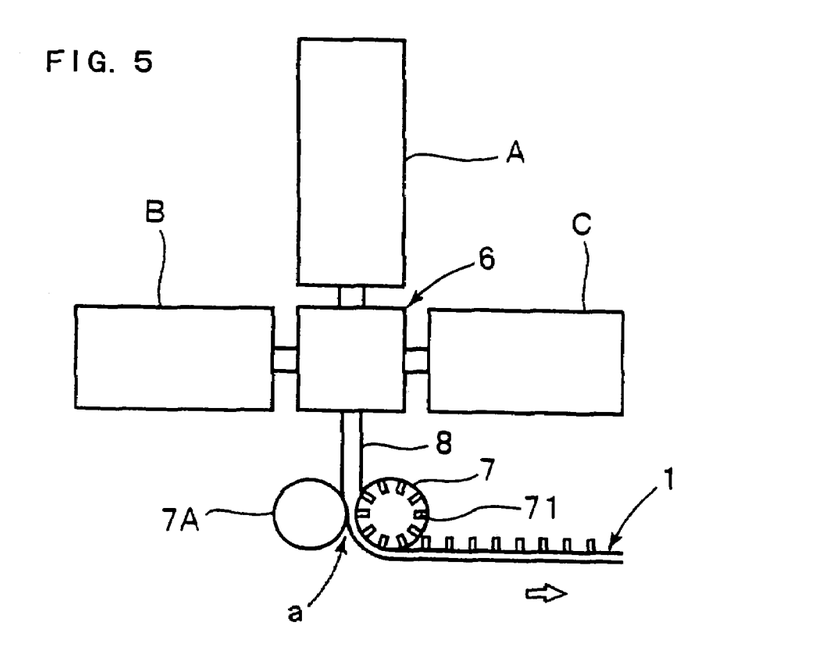
FIG. 5 is a schematic constitutional view which explains manufacture of an expandable thermoplastic resin product with a laminate sheet in the process of being shaped to define raised portions, in accordance with one embodiment of the present invention.

In a particular aspect of the present invention, a laminate sheet 8 having an elastic thermoplastic material provided on at least one surface of an expandable thermoplastic resin sheet, each in a molten state, is introduced between a pair of shaping rolls 7 and 7A with a clearance smaller in dimension than the thickness of the laminate sheet, as shown in FIG. 5. At least one of the pair of shaping rolls 7 and 7A has a plurality of recesses 71 on its periphery. The laminate sheet 8 is withdrawn from between the pair of shaping rolls 7 and 7A and subsequently cooled. As a result, an expandable thermoplastic resin product is obtained which has a plurality of projections corresponding in location to the recesses 71.

Figure 6:
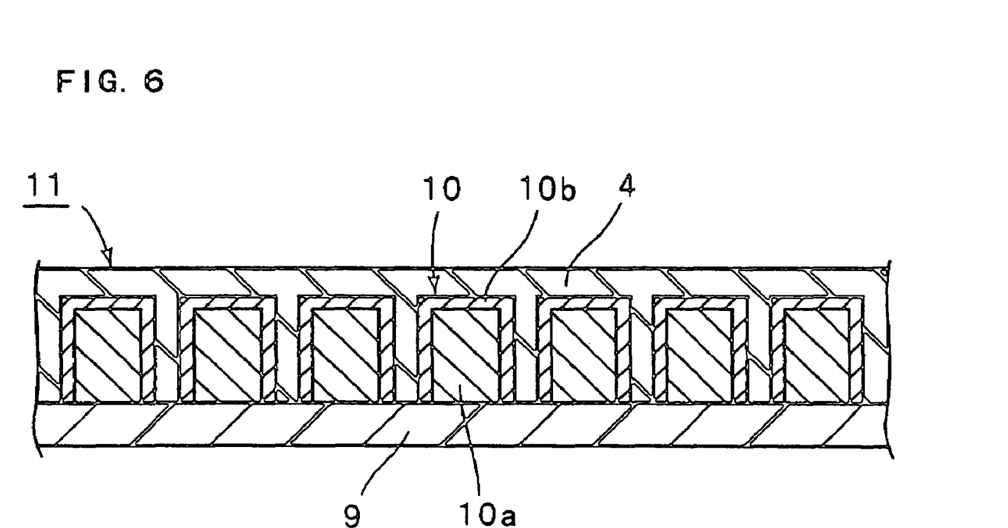
FIG. 6 is a partially cut-away sectional view which shows a thermoplastic resin foam obtained in one embodiment of the present invention.

In the above process, the expandable thermoplastic resin sheet in a molten state is prepared by extruding an expandable thermoplastic resin while in a molten state from a sheet die. The elastic thermoplastic material in a molten state may be laminated therewith by any technique known in the art. For example, an elastic thermoplastic material is supplied in to a kneading extruder where it is melt kneaded. An expandable thermoplastic resin is supplied in to another kneading extruder where it is melt kneaded. The individual melt components are combined by extrusion through a three layer sheet die 6 as shown in FIG. 6 to provide the laminate sheet. This technique enables continuous manufacture of such a laminate sheet. In the case where the elastic thermoplastic material is placed on one surface of the expandable thermoplastic resin sheet, an extruder B may be used alone to supply the elastic thermoplastic material. In the case where the elastic thermoplastic material is placed on both surfaces of the expandable thermoplastic resin sheet, extruders B and C may be used in combination to supply the elastic thermoplastic material.

The technique used to melt knead the expandable thermoplastic resin is not particularly specified. Melt kneading thereof can be achieved by a single- or twin-screw kneading extruder or by a pair of counter rotating rolls, for example. The use of a twin-screw extruder is preferred for its higher kneading ability.

Preferably, the plurality of recesses 71 on the periphery of the shaping roll 7 are arranged in a generally uniform fashion. The generally uniform arrangement improves weight and thickness precisions of a resulting expandable thermoplastic resin product. It is particularly preferred that they are arranged in a zigzag fashion. This zigzag arrangement adds to uniformity and results in the formation of a honeycomb structure in a resulting foam and the further improvement in compressive strength of the resulting foam.

The shape of the recesses 71 on the periphery of the shaping roll 7 is chosen depending on the shape of the raised portions and may be a hexahedron, cylinder or sphere, for example. The cylindrical shape is most preferred since it eases removal of the cooled laminate sheet from the shaping roll.

In the case where the recesses 71 on the periphery of the shaping roll 7 have a cylindrical shape, a diameter of the recess 71 must be varied depending on the contemplated shape of the thermoplastic resin product and is not particularly specified. If the recess diameter is excessively large, removal of the cooled laminated sheet from the shaped roll is made difficult to result in the breakage of the base sheet of the sheet-like structure of expandable thermoplastic resin. On the other hand, if it is excessively small, the raised portions may be broken when the cooled laminate sheet is removed from the shaping roll. Accordingly, the recesses 71 preferably have diameters of 1–30 mm, particularly preferably 2–20 mm.

In the case where the recesses 71 on the periphery of the shaping roll 7 have a cylindrical shape, a depth of the recess 71 must be varied depending on the contemplated shape of the thermoplastic resin product and is not particularly specified. If the recess depth is excessively large, removal of the cooled laminated sheet from the shaped roll is made difficult to result in the breakage of the base sheet of the sheet-like structure of expandable thermoplastic resin. On the other hand, the provision of excessively shallow recesses results in the failure to manufacture an expandable thermoplastic resin product capable of pseudo-one-dimensional expansion. In the light of the foregoing, those recesses preferably have depths of 1–30 mm, more preferably 2–20 mm.

The clearance a defined between the pair of shaping rolls 7 and 7A must be smaller in dimension than the thickness of the laminate sheet 8 in a molten state. The clearance must be varied, within the specified range, depending on the contemplated shape of the resulting expandable thermoplastic resin product and is not particularly specified. The excessively wide clearance makes it difficult to manufacture an expandable thermoplastic resin product capable of pseudo-one-dimensional expansion. On the other hand, the excessively narrow clearance increases a tendency of the base sheet of the sheet-like structure of expandable thermoplastic resin to break upon removal of the cooled laminated sheet from the shaped roll. Accordingly, the clearance a is maintained to generally measure 0.05–3 mm, more preferably 0.1–2 mm.

The laminate sheet 8 may be partly pressed into the recesses 71 of the shaping roll 7 in the following manner. The pair of shaping rolls 7 and 7A, if the clearance a defined therebetween is maintained unvaried, exerts a pressure on the laminate sheet 8 to thereby impart a shape on a sheet surface. The technique for cooling the pressed and shaped laminate sheet 8 is not particularly specified, so long as it can reduce its temperature to a melting point of the expandable thermoplastic resin or below. For example, a cooling water may be circulated within the shaping rolls 7 and 7A.

A specific procedure for manufacture of the expandable thermoplastic resin product 1 is below described with reference to FIGS. 4 and 5.

Figure 4:
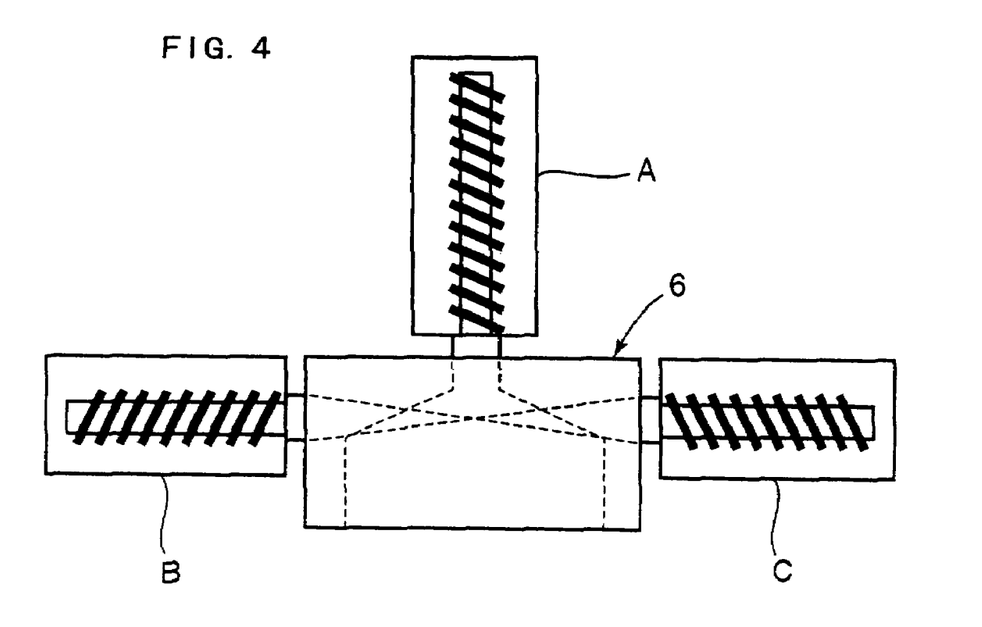
FIG. 4 is a schematic constitutional view which explains an apparatus for use in the manufacture of the expandable thermoplastic resin product of the present invention.

A resin composition which contains constituents of an expandable thermoplastic resin product, is supplied into the extruder A of a three layer sheet extrusion device, as shown in FIG. 4, where it is melt kneaded at a temperature of not below a melt temperature of a thermoplastic resin but below a decomposition temperature of a blowing agent. Concurrently, the preceding elastic thermoplastic material is supplied into either one or both of the extruders B and C where it is kneaded at or over a melt temperature of the elastic thermoplastic material. Respective melt components are passed through a three layer sheet extrusion die 6 having the structure shown in FIG. 4 to provide a laminate sheet having a two- or three-layer structure. As shown in FIG. 5, the laminate sheet 6 is shaped and cooled when it is passed between the pair of counter rotating shaping rolls 7 and 7A with the constant clearance a and the recesses. As a result, an expandable thermoplastic resin product 1 is obtained which has a plurality of raised portions corresponding in shape to those recesses and projecting from a surface of the base sheet 3 of expandable thermoplastic resin, as shown in FIG. 1.

Preferably, the laminate sheet is introduced between the rolls 7 and 7A such that the elastic thermoplastic material in a molten state is brought into contact with the shaping roll 7 having the plurality of recesses generally uniformly provided on its periphery.

As described earlier, the elastic thermoplastic material, when subjected to a compression, bending, tensile or other form of stress, shows elastic deformation over a wider range relative to the thermoplastic resin. Accordingly, if the laminate sheet 8 is introduced such that the elastic thermoplastic material is brought into contact with the shaping roll 7, the laminate sheet, when withdrawn from between the rolls 7 and 7A, extends to a larger degree at locations where the elastic thermoplastic material exists. This prevents breakage of the base sheet covered with the elastic thermoplastic material.

As a consequence, a higher-speed manufacture of the expandable thermoplastic resin product is enabled.

(Thermoplastic Resin Foam)

The thermoplastic resin foam in accordance with the present invention includes a foam sheet having a relatively low expansion ratio and composed of a thermoplastic resin; a plurality of basic raised portions integrally provided on at least one surface of the foam sheet in a distributed manner and comprising a foam having a relatively high expansion ratio; a low foamed layer having a relatively low expansion ratio and disposed to cover areas of the basic raised portions that exclude those in contact with the foam sheet so that the low foamed layer and the basic raised portion together constitute raised portions; and a layer of elastic thermoplastic material disposed to cover the at least one surface of the foam sheet and the raised portions and also fill spaces between the raised portions.

Expansion of the expandable thermoplastic resin product 1 shown in FIG. 1 results in manufacture of the thermoplastic resin foam as shown in FIG. 6. The base sheet 3 shown in FIG. 1 is converted to a foam sheet 9. Expansion of the raised portions 2 shown in FIG. 1 results in the formation of high foamed, basic raised portions 10*a* and a low foamed layer 10*b* which cover areas of the basic raised portions 10*a* that exclude those in contact with the foam sheet 9. When the sheet-like structure of expandable thermoplastic resin is thermally expanded, a surface layer of the raised portions 2 is expanded to a lower degree relative to the rest. This is why expansion of the raised portions results in the formation of the basic raised portions 10*a* and the low foamed layer 10*b* which covers outer surfaces of the basic raised portions 10*a*. Further, the elastic thermoplastic material 4 covers outer surfaces of the raised portions 10 which consist of the basic raised portions 10*a* and the low foamed layer 10*b*. In this case, the elastic thermoplastic material 4 not only covers the raised portions but also fills spaces between the raised portions 10 resulting from expansion of the raised portions 2 (FIG. 1). Accordingly, the resulting thermoplastic resin foam is provided in the form of a sheet or plate having planar top and bottom surfaces.

The thermoplastic resin foam generally takes a sheet or plate form. The elastic thermoplastic material 4, if expanded, reduces a flexural modulus of a resulting thermoplastic resin foam. Such an expansion ratio is preferably 4–20, more preferably 4–10. If the expansion ratio is lower, a thermoplastic resin foam is obtained having a higher compressive strength. Such an expansion ratio is preferably 1–3, more preferably 1–2. The expansion ratio of 1 means the absence of expansion.

If the thickness of the elastic thermoplastic material 4 is large, a weight reduction of the thermoplastic resin foam may not be accomplished. On the other hand, if it is small, a reduction in flexural modulus of the thermoplastic resin foam may not be achieved. Accordingly, it is preferably in the range of 50–300 μm, more preferably in the range of 100–1,000 μm. The elastic thermoplastic material may be either uniform or varied in thickness.

The lower expansion ratio of the basic raised portions 10*a* increases a flexural modulus of the thermoplastic resin foam 11 to result in the failure to accomplish the purpose of the present invention. In contrast, the higher expansion ratio thereof results in obtaining the thermoplastic resin foam having a lower flexural modulus. Accordingly, the expansion ratio of the basic raised portions may preferably be in the range of 2–30, more preferably 3–20.

If the height of the raised portions 10 is excessively large, a flexural modulus of the resulting thermoplastic resin foam 11 may become too high. If it is excessively small, a weight reduction of the thermoplastic resin foam 11 may not be achieved. Accordingly, it is preferably 3–50 mm, more preferably 5–30 mm.

The raised portions 10 may be either uniform or varied in size. If the expansion ratio of the foam sheet 9 is low, a flexural modulus of the resulting thermoplastic resin foam may become too high. If it is high, a compressive strength of the thermoplastic resin foam decreases. Accordingly, the expansion ratio of the foam sheet is preferably 1.1–10, more preferably 2–8. The larger thickness of the foam sheet 9 increases a flexural modulus of the thermoplastic resin foam.

On the other hand, the smaller thickness of the foam sheet 9 reduces a surface strength of the thermoplastic resin foam. Accordingly, the thickness of the foam sheet is preferably 0.1–5 mm, more preferably 0.3–3 mm, further preferably 0.5–2 mm.

The foam sheet 9 may be either uniform or varied in thickness.

Figure 7:
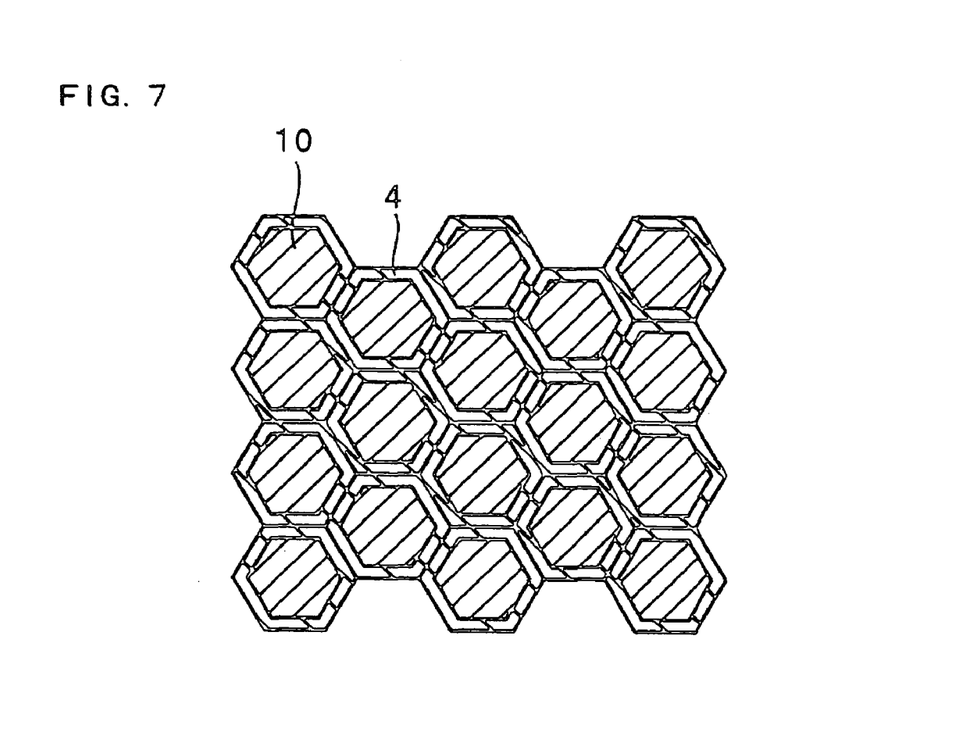
FIG. 7 is a schematic plan view which explains an altered thermoplastic resin foam embodiment of the present invention.

In order that the variations of thickness precision and compressive strength of the thermoplastic resin foam are made small, it is preferred that the raised portions 10 are generally uniformly arranged in a plane extending in the direction of a cross-section of the thermoplastic resin foam. The raised portions 10 may be generally uniformly arranged in accordance with various patterns. For example, they may be arranged in a lattice pattern, as described earlier, or alternatively, in a zigzag pattern, as shown in FIG. 7.

When arranged in a lattice pattern, the raised portions 10 have a shape of a tetragonal prism and increase a compressive strength of the thermoplastic resin foam. When arranged in a zigzag pattern, the raised portions 10 have a shape of a hexagonal prism and together constitute a honeycomb structure in the thermoplastic resin foam. Such a thermoplastic resin foam having a honeycomb structure exhibits a particularly excellent compressive strength.

The preceding thermoplastic resin foam can be obtained by a manufacturing method which comprises thermally expanding the expandable thermoplastic resin product 1 at a temperature equal to or higher than a decomposition temperature of the blowing agent and then cooling the expanded product.

In the thermally expanding step, the expandable thermoplastic resin product 1 may be heated to a temperature equal to or higher than a decomposition temperature of a heat decomposable blowing agent incorporated in the raised portions 2. Heating may be achieved, for example, by using an electric heater, a far-infrared radiating heater or a heating unit which circulates there in a heating medium such as hot oil or air. Various techniques can be utilized to effect cooling. A technique which can cool the expanded product to a temperature equal to or lower than a softening point of a resin constituting the foam 11 may be utilized. For example, cooling can be achieved by using a cooling unit which circulates therein a coolant such as cool water or air.

In a further broad aspect of the present invention, a thermoplastic resin foam is provided which uses a second foam layer in the place of the elastic thermoplastic material 4. In this case, the second foam layer comprises a thermoplastic resin foam. The second foam layer, if having an elastic property in addition to comprising the thermoplastic resin foam, then becomes identical to the elastic thermoplastic material 4. However, the second foam layer does not necessarily comprise the elastic thermoplastic material.

The present invention is below described in more detail by referring to non-limiting examples and comparative examples.

EXAMPLE 1

A composition containing 100 parts by weight of thermoplastic resins mixed at the proportion specified in Table 1, 1 part by weight of a silane crosslinking catalyst master batch (product of Mitsubishi Chemical Corp., product name "PZ10S") and 5 parts by weight of an azodicarbonamide heat decomposable blowing agent (product of Otsuka Chemical Co., Ltd., product name "UNIFOAM AZ SO-20", decomposition temperature of 201□) was supplied into the twin screw extruder A shown in FIG. 5. A styrenic elastomer (product of Kuraray Co., Ltd., product name "SEPTON2043", flexural modulus of 10 MPa) was supplied into the twin screw extruder B shown in FIG. 5.

The twin screw extruders A and B both have a screw diameter of 44 mm and respectively have L/D ratios of 35 and 28. The above-specified composition and the styrenic elastomer were melt kneaded at 180□ in the twin screw extruders A and B, respectively, introduced into the two layer sheet extrusion die 6, and then extruded from its head having a face of 500 mm and a lip opening of 1.0 mm into the form of a two layer sheet. Each of the styrenic elastomer and thermoplastic resin layers measured 0.6 mm thick and a total thickness of the obtained sheet was 1.2 mm.

The two layer sheet obtained was introduced between a 250 mm diameter and 500 mm long roll 7 having recesses 71 arranged in a zigzag pattern on its outer surface, as shown in FIG. 3, and a roll 7A having no recesses (roll clearance of 0.2 mm) such that the styrenic elastomer layer of the two layer sheet was brought into contact with the roll 7 having the recesses 71, then cooled while shaped and finally removed from the rolls 7 and 7A to provide a thermoplastic resin product. The thermoplastic resin product was subsequently immersed in 99□ water for 2 hours so that a crosslinking reaction was caused to proceed, and then dried to obtain an expandable thermoplastic resin product 1. In the expandable thermoplastic resin product 1, the raised portions (inclusive of the elastomer covering layer) arranged in a zigzag pattern were found as being in the form of cylinders having a height of 5 mm and a diameter of 4 mm and arranged at intervals of 12.1 mm. The base sheet measured 0.4 mm thick.

The expandable thermoplastic resin product 1 obtained in accordance with the above procedure was interposed between two sheets of ethylene fluoride, heated for 10 minutes by a heat press controlled at 230 centigrade, and then cooled for 10 minutes by a cold press controlled at 20□ to obtain the aimed thermoplastic resin foam 11. The suchobtained thermoplastic resin foam 11 measured 6.6 mm thick.

A 50×50×6.6 mm piece for a compression test and a 200×25×6.6 mm piece for a flexural test were cut out from the thermoplastic resin foam 11. These test pieces were subjected to compression and flexural tests in accordance with JIS K 7220 and JIS K7221, respectively, to measure a 25% compressive strength and a flexural modulus. The results are given in Table 2.

In Table 2, the results for expansion ratios measured in accordance with JIS K 6767 are also given.

TABLE 1

|  | Example | | | | | | Comp. Ex. | |
| --- | --- | --- | --- | --- | --- | --- | --- | --- |
|  | 1 | 2 | 3 | 4 | 5 | 6 | 1 | 2 |
| Homopolypropylene | 80 | 80 | 80 | 80 | 30 | 80 | 80 | 80 |
| Silane-Grafted Homopolypropylene | 20 | 20 | 20 | 20 | 20 | 20 | 20 | 20 |
| High-Density Polyethylene | — | — | — | — | 50 | — | — | — |

(wt. %)

Homopolypropylene: Product Name "MA3" (Product of Nippon Polychem Co., Ltd., MFR = 10 g/10 min., Flexural Modulus of 1350 MPa)
Silane-Grafted Homopolypropylene: Product Name "XPM800HM" (Product of Mitsubishi Chemical Corp., MFR = 16 g/10 min.)
High-Density Polyethylene: Product Name "HJ340" (Product of Nippon Polychem Co., Ltd., MFR = 1.5 g/10 min.)

TABLE 2

|  | Example | | | | | | Comp. Ex. | |
| --- | --- | --- | --- | --- | --- | --- | --- | --- |
|  | 1 | 2 | 3 | 4 | 5 | 6 | 1 | 2 |
| 25% Compressive Strength (MPa) | 0.60 | 0.58 | 0.61 | 0.52 | 0.65 | 0.59 | 0.60 | 0.65 |
| Flexural Modulus (MPa) | 18.3 | 14.5 | 21.5 | 12.2 | 15.5 | 19.7 | 80.5 | 120.2 |
| Expansion Ratio (cc/g) | 6.0 | 6.0 | 6.0 | 10.0 | 6.0 | 6.0 | 10.0 | 6.0 |

EXAMPLE 2

A composition containing 100 parts by weight of thermoplastic resins at the proportion specified in Table 1, 1 part by weight of a silane crosslinking catalyst master batch (product of Mitsubishi Chemical Corp., product name "PZ10S") and 5 parts by weight of an azodicarbonamide heat decomposable blowing agent (product of Otsuka Chemical Co., Ltd., product name "UNIFOAM AZ SO-20", decomposition temperature of 201□) was supplied into the twin screw extruder A shown in FIG. 5. A styrenic elastomer (product of Kuraray Co., Ltd., product name "SEPTON2043", flexural modulus of 10 MPa) was supplied into the twin screw extruders B and C shown in FIG. 5.

The twin screw extruders A, B and C all have a screw diameter of 44 mm. The twin screw extruder A has an L/D ratio of 35. The twin screw extruders B and C both have an L/D ratio of 28. The above-specified composition and the styrenic elastomer were melt kneaded at 180□ in the twin screw extruder A and the twin screw extruders B and C, respectively, introduced into a three layer sheet extrusion die and extruded from its head having a face of 500 mm and a lip opening of 1.0 mm into the form of a three layer sheet. For the sheet obtained, a top styrenic elastomer layer, a middle thermoplastic resin layer and a bottom styrenic elastomer layer measured 0.3 mm, 0.6 mm and 0.3 mm, respectively. Subsequently, the procedure of Example 1 was followed to manufacture the expandable thermoplastic resin product and the thermoplastic resin foam.

EXAMPLE 3

The material to be extruded from the twin screw extruder B was changed to an ethylene-vinyl acetate copolymer (product of Mitsubishi Chemical Corp., product name "NOVATECLV660": vinyl acetate content of 28%, MFR=6.0 g/10 minutes, flexural modulus of 100 MPa). Otherwise, the procedure of Example 1 was followed.

EXAMPLE 4

The material to be extruded from the twin screw extruder B was changed to a composition containing 100 parts by weight of a resin composition containing 90 wt. % of an ethylene-vinyl acetate copolymer (product of Mitsubishi Chemical Corp., product name "NOVATEC LV660": vinyl acetate content of 28%, MFR=6.0 g/10 minutes, flexural modulus of 100 MPa) and 10 wt. % of a silane-grafted ethylene-vinyl acetate copolymer (product of Mitsubishi Chemical Corp., product name "LINKRON XVF750N", flexural modulus of 40 MPa), 0.5 parts by weight of a silane crosslinking catalyst master batch (product of Mitsubishi Chemical Corp., product name "VZ10") and 5 parts by weight of an azodicarbonamide heat decomposable blowing agent (product of Otsuka Chemical Co., Ltd., product name "UNIFOAM AZ SO-20", decomposition temperature of 201□). Otherwise, the procedure of Example 1 was followed.

EXAMPLE 5

The proportion of the thermoplastic resins to be extruded from the twin screw extruder A was changed to that specified in Table 1. Otherwise, the procedure of Example 1 was followed.

EXAMPLE 6

In obtaining the expandable thermoplastic resin product in Example 1, the two layer sheet was introduced such that the thermoplastic resin layer was located to contact with the roll 7 having the recesses. Otherwise, the procedure of Example 1 was followed. The obtained expandable thermoplastic resin product was found to include raised portions covered with the elastomer and arranged in a zigzag pattern. Such elastomer covered raised portions were observed to exist in the form of cylinders having a height of 5.3 mm and a diameter of 4 mm and arranged at intervals of 12.1 mm, and accordingly be almost comparable in configuration to those of the expandable thermoplastic resin product obtained in Example 1. However, undesirable results, such as partial breakage of some raised portions, occurred.

COMPARATIVE EXAMPLE 1

A composition containing 100 parts by weight of thermoplastic resins at the proportion specified in Table 1, 1 part by weight of a silane crosslinking catalyst master batch (product of Mitsubishi Chemical Corp., product name "PZ10S") and 5 parts by weight of an azodicarbonamide heat decomposable blowing agent (product of Otsuka Chemical Co., Ltd., product name "UNIFOAM AZ SO-20", decomposition temperature of 201□) was supplied into the twin screw extruder A shown in FIG. 5. No material was supplied into the twin screw extruders B and C. A single layer sheet from the die was introduced between the rolls 7 and 7A to provide an expandable thermoplastic resin foam composed of those thermoplastic resins. Otherwise, the procedure of Example 1 was followed.

COMPARATIVE EXAMPLE 2

The material to be extruded from the twin screw extruder B was changed to a polyamide-based nylon 66 (product of Ube Industries, Ltd., product name "UBE NYLON 2015B", flexural modulus of 2,900 MPa). Otherwise, the procedure of Example 1 was followed.

EXAMPLE 7

As the material for constituting the sheet-like structure of expandable thermoplastic resin, a mixture containing 100 parts by weight of thermoplastic resins at the proportion specified in Table 3, 1 part by weight of a silane crosslinking catalyst master batch (product of Mitsubishi Chemical Corp., product name "PZ10S") and 5 parts by weight of an azodicarbonamide heat decomposable blowing agent (product of Otsuka Chemical Co., Ltd., product name "UNIFOAM AZ SO-20", decomposition temperature of 210□) was supplied into a corotating twin screw extruder (PCM 30, manufactured by Ikegai Tekko Co., Ltd.) where it was melt kneaded at 190□.

As the material for constituting the second foam layer, a mixture containing 100 parts by weight of a resin composition containing 90% by weight of an ethylene-vinyl acetate copolymer (product of Mitsubishi Chemical Corp., product name: NOVATEC LV660, vinyl acetate content of 28 weight %, MFR of 6.0 g/10 minutes, flexural modulus of 100 MPa) and 10% by weight of a silane-grafted ethylene-vinyl acetate copolymer (product of Mitsubishi Chemical Corp., product name: LINKRONXVF750N, flexural modulus of 40 MPa), 0.5 parts by weight of a silane crosslinking catalyst master batch (product of Mitsubishi Chemical Corp., product name: VZ10) and 5 parts by weight of an azodicarbonamide heat decomposable blowing agent (product of Otsuka Chemical Co., Ltd., product name: UNIFOAM AZ SO-20, decomposition temperature of 210□) was supplied into a corotating twin screw extruder (PCM 30, manufactured by Ikegai Tekko Co., Ltd.) where it was melt kneaded at 190□.

The melt resins from those two extruders were introduced into a two layer sheet extrusion die and extruded from its head having a face of 500 mm and a lip opening of 1.0 mm into the form of a two layer sheet. Each of the sheets for the sheet-like structure of expandable thermoplastic resin and the second foam sheet measured 0.6 mm thick and a total thickness of the obtained two layer sheet was 1.2 mm.

Subsequently, the two layer sheet was introduced between a roll 7 having recesses and a roll 7A such that the sheet for the second foam layer was brought into contact with the roll 7 having the recesses, cooled while shaped and then removed from the rolls 7 and 7A to provide a laminate sheet. This laminate sheet was subsequently immersed in 99□ water for 2 hours so that a crosslinking reaction was caused to proceed, and then dried to obtain an expandable resin product. The expandable resin product was found to include raised portions in the form of cylinders having a height of 5 mm and a diameter of 4 mm and arranged in a zigzag pattern at intervals of 12.1 mm, and a sheet portion which measured 0.4 mm thick.

The expandable resin product was processed in the same manner as in Example 1 to obtain a layered thermoplastic resin foam. The layered thermoplastic resin foam measured 6.6 mm thick. Test pieces were cut out from this foam to measure 25% compressive strength, flexural modulus and expansion ratio in the same procedure as in Example 1. The results are given in Table 4.

EXAMPLE 8

In Example 7, the ethylene-vinyl acetate copolymer used as the material for constituting the second foam layer was replaced by low-density polyethylene having a flexural modulus of 500 MPa. Otherwise, the procedure of Example 7 was followed to obtain a layered resin foam and measure 25% compressive strength, flexural modulus and expansion ratio of the foam. The results are given in Table 4.

EXAMPLE 9

In Example 7, the ethylene-vinyl acetate copolymer used as the material for constituting the second foam layer was replaced by linear low-density polyethylene having a flexural modulus of 700 MPa. Otherwise, the procedure of Example 7 was followed to obtain a layered resin foam and measure 25% compressive strength, flexural modulus and expansion ratio of the foam. The results are given in Table 4.

COMPARATIVE EXAMPLE 3

As the material for constituting the sheet-like structure of expandable thermoplastic resin, a mixture containing 100 parts by weight of thermoplastic resins at the proportion specified in Table 3, 1 part by weight of a silane crosslinking catalyst masterbatch (product of Mitsubishi Chemical Corp., product name: PZ10S) and 5 parts by weight of azodicarbonamide (product of Otsuka Chemical Co., Ltd., product name "UNIFOAM AZ SO-20", decomposition temperature of 210☐) as a heat decomposable blowing agent was supplied into a corotating twin screw extruder (PCM 30, manufactured by Ikegai Tekko Co., Ltd.) where it was melt kneaded at 190☐.

The melt resin from the extruder was introduced into a single layer sheet extrusion die and extruded from its head having a face of 500 mm and a lip opening of 1.0 mm into the form of a single layer sheet. The resulting sheet measured 1.2 mm thick.

The single layer sheet was subsequently introduced between the preceding rolls 7 and 7A (roll clearance of 0.2 mm), cooled while shaped and then removed from those rolls to provide a shaped sheet. This shaped sheet was subsequently immersed in 99☐ water for 2 hours so that a crosslinking reaction was caused to proceed, and then dried to obtain an expandable resin product. The expandable resin product was found to include raised portions in the form of cylinders having a height of 5 mm and a diameter of 4 mm and arranged in a zigzag pattern at intervals of 12.1 mm. A basic sheet portion thereof measured 0.4 mm thick.

The expandable resin product made in accordance with the above procedure was processed in the same manner as in Example 1 to obtain a thermoplastic resin foam. The thermoplastic resin foam measured 6.5 mm thick. Test pieces were cut out from this foam to measure 25% compressive strength, flexural modulus and expansion ratio of the foam. The results are given in Table 4.

TABLE 3

| Type of Resin | Resin Grade | wt. % |
| --- | --- | --- |
| Homopolypropylene | MA3, Product of Nippon Polychem Co., Ltd. | 30 |
| Silane-Grafted Homopolypropylene | XPM800HM, Product of Mitsubishi Chemical Corp. | 20 |
| High-Density Polyethylene | HJ340, Product of Nippon Polychem Co., Ltd. | 50 |

TABLE 4

| | | | Example | | | Comp. Ex. |
| --- | --- | --- | --- | --- | --- | --- |
| | | | 7 | 8 | 9 | 3 |
| Expandable Resin | Thermoplastic Resin Components of the Sheet-Like Structure of Expandable Thermoplastic Resin | — | Resins Specified in Table 3 | Resins Specified in Table 3 | Resins Specified in Table 3 | Resins Specified in Table 3 |
| | Thermoplastic Resin Component of the Second Foam Layer | — | EVA/ Si-EVA | Low-Density PE | Linear Low-Density PE | ☐ |
| | Resin Flexural Modulus of the Second Foam Layer | MPa | 40 | 500 | 700 | ☐ |
| Layered Foam | 25% Compressive Strength | MPa | 0.65 | 0.63 | 0.64 | 0.62 |
| | Flexural Modulus | MPa | 12.5 | 14.8 | 18.3 | 40.6 |
| | Mean Expansion Ratio | — | 8.0 | 7.9 | 7.5 | 7.3 |

Also, a 50 mm×50 mm rectangular plate having a thickness of 6.6 mm was cut out from the foam obtained to prepare a sample. The sample was compressed such that a strain rate (a change in thickness of the sample per unit time/an original thickness of the sample) was maintained at a value of 20 to measure an absorption energy versus compressive strength. The energy absorption increases as the volume displaced by the compression increases, i.e., as a compressive stress increases. In this measurement, the energy absorption when the compressive stress reached 10 kgf/cm$^2$ was measured using a universal testing machine (marketed under the product name "TENSILON" and manufactured by A & D Co., Ltd.) and recorded as the energy absorption for each sample. The results are given in the following Table 5.

TABLE 5

|  | Example |  |  |  |  |  |  |  |  | Comp. Ex. |  |  |
| --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 |
| Absorption Energy (kgf□ cm/cm$^3$) | 0.30 | 0.34 | 0.26 | 0.40 | 0.35 | 0.23 | 0.35 | 0.32 | 0.29 | 0.21 | 0.15 | 0.18 |

EFFECTS OF THE INVENTION

The expandable thermoplastic resin product in accordance with the present invention has an elastic thermoplastic material layer superimposed on a sheet-like structure of expandable thermoplastic resin. Accordingly, when expansion of the expandable thermoplastic resin product is effected, the base sheet of the sheet-like structure of expandable thermoplastic resin is converted into the foam sheet having a relatively low expansion ratio, the raised portions of the sheet-like structure of expandable thermoplastic resin are converted into the basic raised portions having a high expansion ratio and located on a surface of the foam sheet and the low foamed layer which covers outer surfaces of the areas of the basic raised portions that exclude those in contact with the foam sheet, and the elastic thermoplastic material is converted into a such form that covers outer surfaces of the raised portions. As a result, the thermoplastic resin foam in accordance with the present invention can be obtained.

The thermoplastic resin foam in accordance with the present invention exhibits a high compressive strength upon application thereto of a compressive stress, since the elastic thermoplastic material covers the outer surfaces of the raised portions consisting of the high foamed basic raised portions and the low foamed layer. Also, it exhibits a low elastic modulus when a flexural stress is applied thereto since such a stress is concentrated at the highly flexible elastic thermoplastic material which covers the basic raised portions having a high expansion ratio. Therefore, thermoplastic resin foams suitable for use as various cushioning an damping materials can be provided. Because of the high compressive strength in a thickness direction and the low flexural modulus, as stated above, the thermoplastic resin foam readily conforms to a contoured surface and thus can be suitably used as shock absorbers such as a protector.

When the elastic thermoplastic material is a foam, particularly when a thermoplastic elastomer having a flexural modulus in the range of 5 MPa–1,000 MPa, the thermoplastic resin foams can be obtained which has an outer surface covered with a flexible material and thus has imparted thereto a further reduced flexural modulus. Therefore, thermoplastic resin foams can be provided which constitute further improved shock absorbing, cushioning and damping materials.

The invention claimed is:

1. A thermoplastic resin foam including:
   a foam sheet composed of a thermoplastic resin and having a relative low expansion ratio;
   a plurality of basic raised portions integrally provided on at least one surface of said foam sheet in a distributed manner, said basic raised portions comprising a thermoplastic resin foam having a relatively high expansion ratio;
   a low foamed layer having a relatively low expansion ratio and disposed so as to cover portions of the basic raised portions not in contact with the foam sheet, the low foamed layer and the basic raised portions together defining raised portions; and
   a layer of elastic thermoplastic material disposed so as to cover the low foamed layer of the raised portions, portions of the at least one surface of the foam sheet not in contact with the raised portions, and fill spaces between the raised portions.

2. The thermoplastic resin foam as recited in claim 1, wherein said layer of elastic thermoplastic material has a foam structure.

3. The thermoplastic resin foam as recited in claim 1, wherein said layer of elastic thermoplastic material has a flexural modulus of 5 MPa–1,000 MPa.

4. The thermoplastic resin foam as recited in claim 1, wherein said elastic thermoplastic material comprises a thermoplastic resin produced via crosslinking of the thermoplastic resin which constitutes said foam sheet.

5. The thermoplastic resin foam as recited in claim 4, wherein said crosslinking of the thermoplastic resin is achieved by a method using a silane-grafted polymer.

6. The thermoplastic resin foam of claim 1, wherein the elastic thermoplastic material covers 10–60% of the at least one surface of the foam sheet, and said raised portions cover 40–90% of the at least one surface of the foam sheet.

7. The thermoplastic resin foam of claim 1, wherein a distance between the center of each of the raised portions to neighboring raised portions is from 2–50 mm.

8. The thermoplastic resin foam of claim 1, wherein the foam sheet is from 0.1–5 mm thick.

9. The thermoplastic resin foam of claim 1, wherein the elastic thermoplastic material is from 50–300 μm thick.

10. The thermoplastic resin foam of claim 1, wherein the elastic thermoplastic material is from 100–1,000 μm thick.

11. The thermoplastic resin foam of claim 1, wherein the elastic thermoplastic material has an expansion ratio of from 4–20.

12. The thermoplastic resin foam of claim 1, wherein the basic raised portions have an expansion ratio of from 2–30.

13. The thermoplastic resin foam of claim 1, wherein the raised portions have a height of from 3–50 mm.

14. The thermoplastic resin foam of claim 1, wherein the foam sheet has an expansion ratio of from 1.1–10.

15. The thermoplastic resin foam as recited in claim 2, wherein said layer of elastic thermoplastic material has a flexural modulus of 5 MPa–1,000 MPa.

16. The thermoplastic resin foam as recited in claim 2, wherein said elastic thermoplastic material comprises a thermoplastic resin produced via crosslinking of the thermoplastic resin which constitutes said foam sheet.

17. The thermoplastic resin foam as recited in claim 3, wherein said elastic thermoplastic material comprises a thermoplastic resin produced via crosslinking of the thermoplastic resin which constitutes said foam sheet.

18. A thermoplastic resin foam including:
  a foam sheet having a relatively low expansion ratio and composed of a thermoplastic resin;
  a plurality of basic raised portions integrally provided on at least one surface of said foam sheet in a distributed manner, said basic raised portion comprised of a thermoplastic resin foam having a relatively high expansion ratio;
  a low foamed layer having a relatively low expansion ratio and disposed so as to cover portions of the basic raised portions not in contact with the foam sheet, the low foamed layer and the basic raised portions together defining raised portions; and
  a second foam layer disposed so as to cover the at least one surface of the foam sheet, said plurality of raised portions, and fill spaces between the raised portions.

* * * * *